United States Patent
Reinicke

[11] Patent Number: 6,068,010
[45] Date of Patent: May 30, 2000

[54] MICROVALVE AND MICROTHRUSTER FOR SATELLITES AND METHODS OF MAKING AND USING THE SAME

[75] Inventor: Robert H. Reinicke, Mission Viejo, Calif.

[73] Assignee: Marotta Scientific Controls, Inc., Montville, N.J.

[21] Appl. No.: 08/663,005

[22] Filed: Jun. 7, 1996

Related U.S. Application Data

[60] Provisional application No. 60/000,106, Jun. 9, 1995.

[51] Int. Cl.[7] ................................... F16K 31/02
[52] U.S. Cl. .................. 137/1; 251/129.16; 251/129.21; 251/65; 137/544
[58] Field of Search ............... 251/129.15, 129.16, 251/129.21, 65, 129.06, 129.01; 137/544, 545, 1

[56] References Cited

U.S. PATENT DOCUMENTS

| | | |
|---|---|---|
| 2,837,623 | 6/1958 | Judson et al. . |
| 2,860,850 | 11/1958 | Rhodes et al. ............ 251/129.21 |
| 3,245,652 | 4/1966 | Roth .................... 251/129.21 X |
| 3,750,999 | 8/1973 | Genbauffe . |
| 3,896,857 | 7/1975 | Turner et al. . |
| 4,053,136 | 10/1977 | Perl . |
| 4,412,650 | 11/1983 | Young et al. . |
| 4,474,889 | 10/1984 | Terry et al. . |
| 4,508,314 | 4/1985 | Hemme . |
| 4,604,090 | 8/1986 | Reinicke . |
| 4,626,244 | 12/1986 | Reinicke . |
| 4,715,852 | 12/1987 | Reinicke et al. . |
| 4,756,508 | 7/1988 | Giachino et al. ............. 251/129.06 X |
| 5,022,341 | 6/1991 | Eveanowsky et al. . |
| 5,267,584 | 12/1993 | Smith . |
| 5,322,258 | 6/1994 | Bosch et al. ................... 251/65 |
| 5,323,999 | 6/1994 | Bonne et al. . |
| 5,329,965 | 7/1994 | Gordon . |
| 5,472,462 | 12/1995 | Pischinger et al. . |
| 5,474,100 | 12/1995 | Nishijima et al. ............ 251/65 X |
| 5,681,024 | 10/1997 | Lisec et al. . |
| 5,746,914 | 5/1998 | Hanna et al. . |

FOREIGN PATENT DOCUMENTS

| | | |
|---|---|---|
| 0142866 | 5/1985 | European Pat. Off. . |
| 62-108156 | 5/1987 | European Pat. Off. . |
| 0824022 | 8/1996 | European Pat. Off. . |
| 2739085 | 3/1979 | Germany ............... 251/129.21 |
| 1241867 | 8/1991 | United Kingdom . |
| 9428318 | 12/1994 | WIPO . |
| WO9428318 | 12/1994 | WIPO . |
| WO9509988 | 4/1995 | WIPO . |

OTHER PUBLICATIONS

K.N. Kozubsky et al., "Plan and Status of the Development and Qualification Program for the Stationary Plasma Thruster," AIAA/SAE/ASME/ASEE 29th Jt. Propulsion Conf. and Ex., Jun. 1993.

G. Wallis et al., "Field Assisted Glass–Metal Sealing," *J. Appl. Phys.*, vol. 40, No. 10, Sep. 1969.

G. Wallis, "Field Assisted Glass Sealing," *Electrocomponent Sci. Tech.*, Vo. 2, No. 1, 1975.

(List continued on next page.)

*Primary Examiner*—Kevin Lee
*Attorney, Agent, or Firm*—Hopgood, Calimafde, Kalil & Judlowe, LLP

[57] ABSTRACT

A microvalve and microthruster are provided. Both include a housing with an interior in which an armature can travel and abut a valve seat to provide an electromagnetic valve. The armature acts as a valve body that is maintained in a or normally closed position by a permanent magnet, and is opened by interaction with a selectively activatable electromagnet. A microthruster is provided by fashioning the valve discharge as a nozzle, preferably of a material that is permanently and selectively magnetizable, so that the nozzle functions as the permanent magnet and which magnetism can be adjusted to assure proper opening and closing of the valve portion. The valve body is guided without any sliding fit mechanism and is suitable for controlling gas or liquid fluid flows.

38 Claims, 7 Drawing Sheets

OTHER PUBLICATIONS

J.B. Angell et al., "Silicon Micromechanical Devices," *Sci. Am.*, Apr. 1983.

K.E. Petersen, "Silicon as a Mechanical Material," *Proc. IEEE*, vol. 70, No. 5, May 1982.

PCT International Search Report, International Application No. PCT/US97/09725, Date of Mailing of the International Search Report Sep. 5, 1997, 6 pages.

PCT Written Opinion (PCT Rule 66), International Application No. PCT/US97/09725, Date of Mailing Jun. 29, 1998, 6 pages.

PCT International Preliminary Examination Report (PCT Rule 71.1), International Application No. PCT/US97/09725, Date of completion of this report Oct. 15, 1998, 6 pages.

PCT International Search Report, International Application No. PCT/US97/09962, Date of Mailing Oct. 7, 1997, 7 pages.

PCT Written Opinion (PCT Rule 66), International Application No. PCT/US97/09962, Date of Mailing Jun. 24, 1998, 5 pages.

PCT International Preliminary Examination Report (PCT Article 36 and Rule 70), International Application No. PCT/US97/09962, Date of completion of this report Aug. 11, 1998, 4 pages.

Douglas H. Morash and Leon Strand, "Miniature Propulsion Components for the Pluto Fast Flyby Spacecraft," AIAA Paper 94–3374, presented at the AIAA Joint Propulsion Conference, Jun. 27–29, 1994, 11 pages.

Angell, James, B., et al. (Apr. 1983) "Silicon Micromechanical Devices" *Scientific American* p. 36–47 (Exhibit 16).

Petersen, Kurt, E. (May 1, 1982) "Silicon as a Mechanical Material" *Proceedings of the IEEE* vol. 70(5):420–457 (Exhibit 17).

Supplementary European Search Report, EPO Application No. EP 97 92 9874 (Apr. 28, 1999).

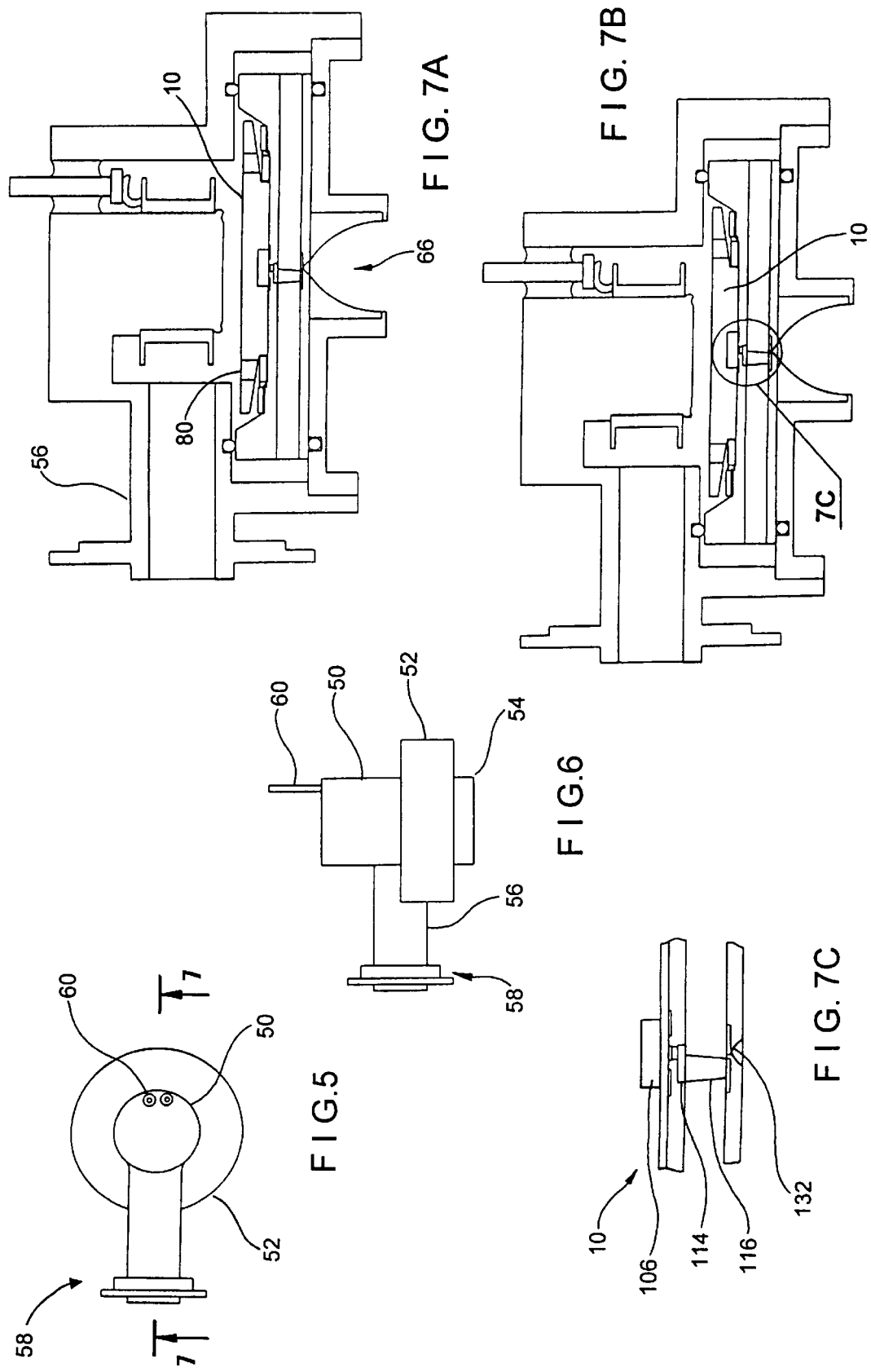

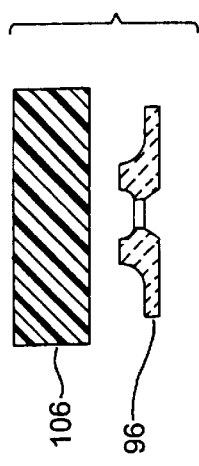
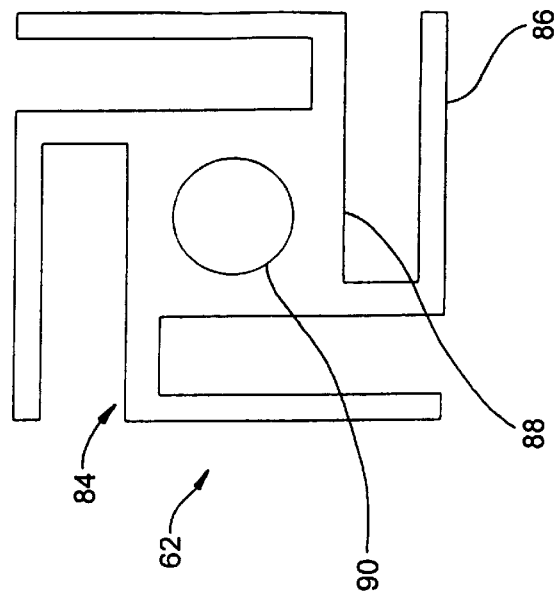
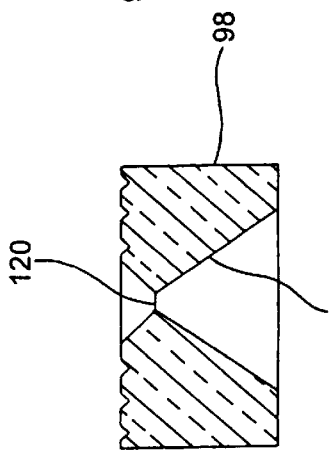
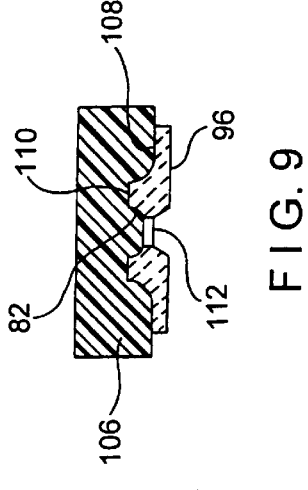
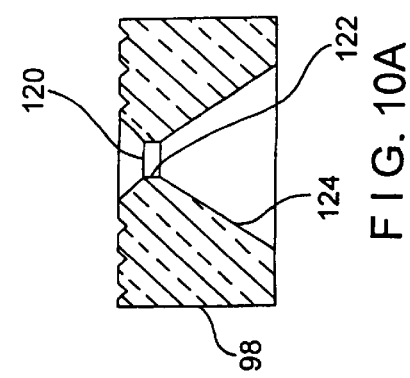

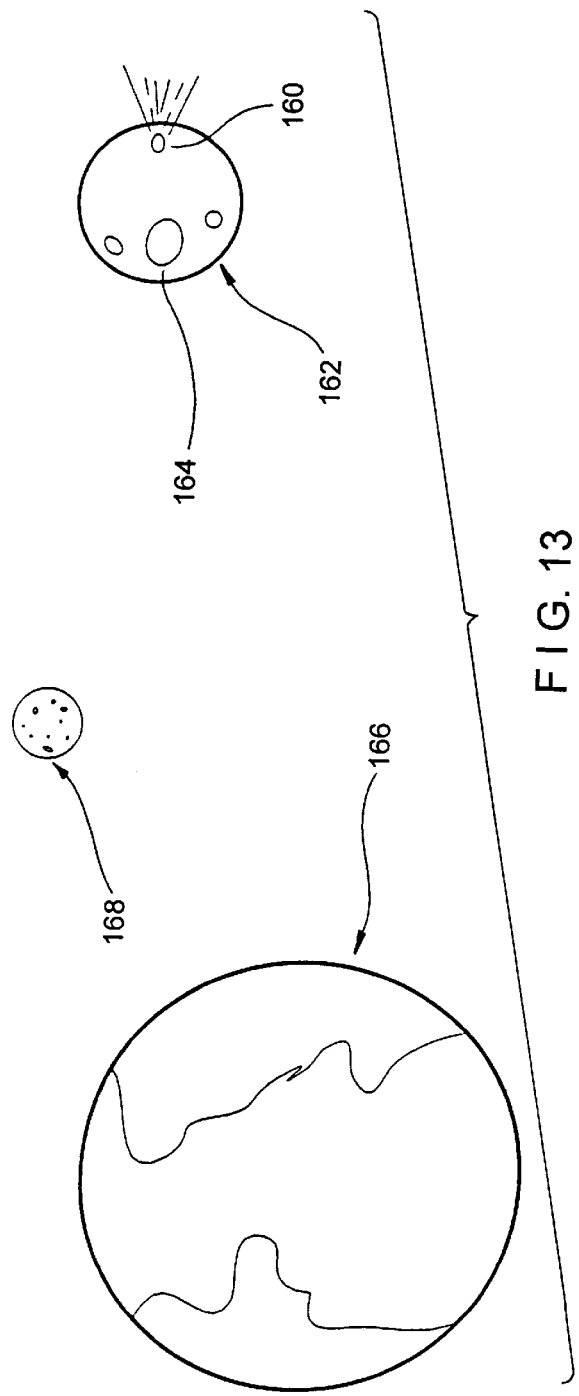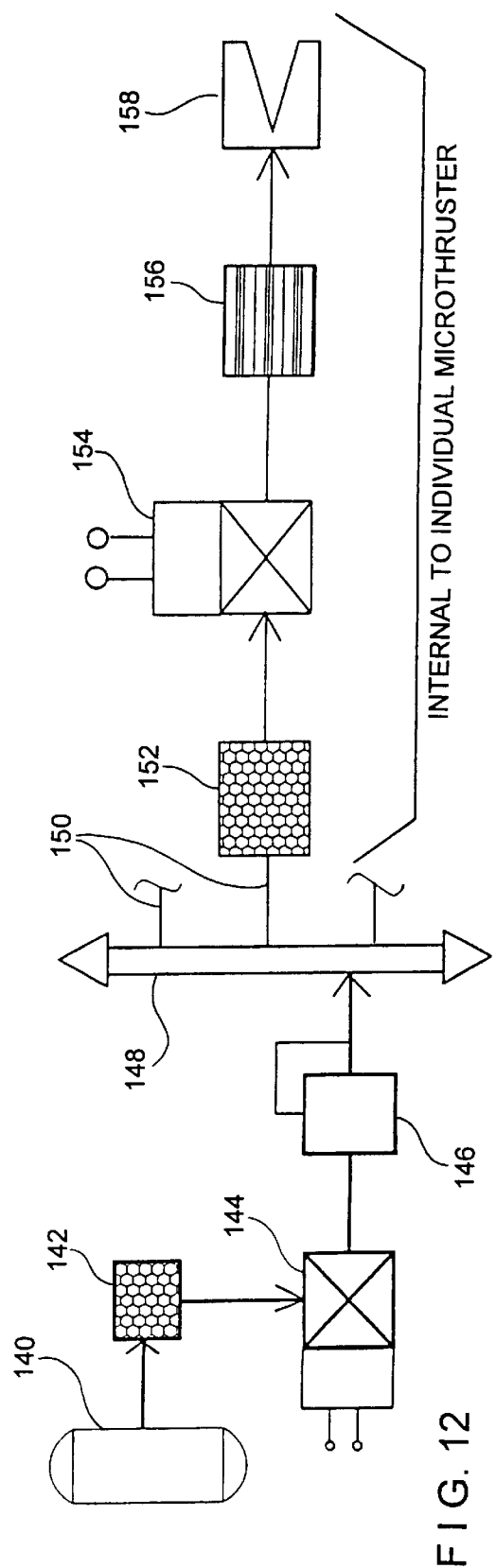

MICROVALVE AND MICROTHRUSTER FOR SATELLITES AND METHODS OF MAKING AND USING THE SAME

This application is based on provisional application Ser. number 60/000,106, filed Jun. 9, 1995, the disclosure of which is incorporated herein by reference in its entirety.

BACKGROUND OF THE INVENTION

1. Field of the Invention

The invention relates to a microvalve, a microthruster system including the microvalve, both having application for spacecraft and other satellites, and in particular for use in orbital orientation, such as the 3-axis stabilization of microspacecraft, and to the methods of making and using such devices, and to satellites and other apparatus incorporating such devices. The disclosures of a co-filed application, entitled "Micro-Gas Rheostat" and of related subject matter, filed this same date, and the provisional application Ser. number 60/000,107 on which it is based, filed Jun. 9, 1995, are both incorporated herein by reference.

2. State of the Art

Spacecraft, including satellites (i.e., human-made satellites rather than natural satellites), both those carrying a living payload and those for such uses as extraterrestrial exploration, research, communications, surveillance, and the like, may typically have a number of different thrusters for propulsion and orientation of the craft. For present day satellites, which are of a relatively large construction, the thrusters are larger and more expensive than needed for microspacecraft. These traditional thrusters generally use solenoid-operated on-off valves and nozzles comprised of many different parts, with the parts individually made by traditional machine-shop cutting tools. Parts are individually assembled, using traditional attachment and sealing methods. There is presently a move towards developing smaller craft, such as microsatellites, which have reduced costs of both construction and launching.

Silicon is most familiar as the material used to make micro-size, inexpensive, multi-million element electronic microprocessors. The miniaturization, precision, low cost/high volume benefits of silicon batch processing have revolutionized the electronics industry. A derivative technology called "micromachining" allows precision micro-electromechanical systems (MEMS) to be inexpensively batch-processed from silicon, with precision, excellent producibility, and low-cost attributes analogous to such features of today's microelectronics.

The state of the art of miniature space application cold-gas thruster nozzles is perhaps best represented by thrusters recently produced for the Pluto Fast Flyby and Tethered Satellite System (TSS) programs. AIAA paper No. 94-3374 describes a miniature 0.001 $lb_f$ (0.004 Newton) nitrogen gas thruster produced by Moog, Inc., East Aurora, N.Y., for the Pluto Fast Flyby program. (See, e.g., AIAA Paper 94-3374, *Miniature Propulsion Components for the Pluto Fast Flyby Space Craft*, Douglas H. Morash, Moog, Inc. and Leon Strand, JPL, California Institute of Technology, Pasadena, Calif., presented at the AIAA Joint Propulsion Conference, Jun. 27–29, 1994, Indianapolis, Ind.) It uses a sliding-fit plunger type style solenoid valve and a conical diverging nozzle. The unit operates at 5 psia, weighs 0.016 lb (7.3 gram), requires 11 watts (28 vdc, 68° F.), and responds in 0.94 ms (opening) and 0.2 ms (closing). The overall size is approximately 0.50 in. diameter by 1.00 long. Thruster performance (thrust level, specific impulse, impulse bit, etc.) was not measured in the referenced conference paper. Throat diameter is estimated to be 0.014 in.

Marotta Scientific Controls, Inc., Montville, N.J., with Devtec, Ltd., Dublin, Ireland, recently successfully developed and qualified a 0.225 $lb_f$ (1 Newton) nitrogen gas-thruster nozzle for the thruster of the Tethered Satellite System (TSS). The diverging section of the TSS nozzle has the classical "bell" shape. The TSS nitrogen gas thruster operates at 138 psia, has a 0.032 in. diameter throat and a 120:1 area ratio. The actual thruster Isp (specific impulse) was measured at 71 seconds.

It is generally agreed that a true microvalve is defined as one made, at least in part, of silicon material, and produced by micromachining, thus possessing precision, producibility, and miniaturization characteristics not possible with traditionally designed and fabricated valves. Using this definition, no microvalves have been used in the space program of any country. The state of the art of silicon microvalves is represented by commercial, non-flight products manufactured by three companies in the California "Silicon Valley" area. Commercially available microvalves are indeed much smaller and lighter than traditional valves, and major strides have been made in providing microvalves that "really shut-off", and in improving the manufacturing yield rates.

However, there is a major conceptual weakness common to these commercial microvalves when they are considered for space-flight applications in that they all employ thermally-based actuators (memory metal, thermal expansion bi-morph, and vapor pressure-type actuators). Thermally-based actuators impose several very severe product-application limitations - especially in the aerospace arena and high-end, non-flight commercial applications:

Limited Temperature Range: thermal (temperature-dependent) actuation severely limits the maximum temperature (to 50–60° C.), as well as the temperature range, to values well under those needed in many aerospace applications. Thermal management will be an even greater problem in (and may even preclude) cryogenic usage.

Packaging Concerns: when several microvalves are closely manifolded together in the same silicon substrate, thermal management may preclude dense packaging (e.g., the heating of one valve may cause the actuation of an adjacent valve), and so thermally-actuated valves have a limited packaging density.

Unsuitable for Liquids: such thermally-based actuators suffer material incompatibility, the necessity to stay under the vapor temperature of liquid effluents, which is exacerbated by thermal conduction from the actuator to the effluent, and hence do not allow these devices to be used in most liquid, or corrosive gas, aerospace and medical applications and environments.

Low Sealing Force: these prior art devices typically generate a sealing force of about 5 to about 25 grams, as opposed to the instant devices which generate a sealing force on the order of 100 grams.

From a practical point of view, the state of the art in microvalves and microthrusters is a control valve that is essentially a hole in a piece of metal. As such, the tolerance of the hole diameter is about 15 mil (0.015 in.)±about 1 mil for accurate reproducibility. Further, for orientation thrusters, the supply gas tank is typically regulated in a single stage down to 300 psi, which must be further regulated down in a second stage to approximately 5 psia to achieve thrust forces on the order of one millipound (0.001 $lb_f$). Thus, a complicated pressure control system is also required for the prior art apparatus.

SUMMARY AND OBJECTS OF THE INVENTION

It is a primary object of the invention to provide a microvalve, and a microthruster, of the character indicated, featuring smaller size, lighter weight, faster response and lower power requirements than heretofore in the space program.

This object is achieved in an electromechanical microthruster configuration which utilizes the miniaturization, precision, and low-cost/high-volume benefits of silicon that have revolutionized the electronics industry. Silicon micromachining is employed to make a valve seat that is no larger than the very tiny size actually needed, for example, for a 0.001 $lb_f$ thruster, as compared to traditional techniques which result in needlessly large, oversize, high-power valving. The new construction utilizes a very small, efficient, low-power microvalve actuator that provides extremely fast valve response. A micronozzle is micromachined in the exit of the valve seat, thus providing a closely integrated, minimum volume, highly responsive configuration. The product is a combined microvalve/micronozzle which provides much smaller impulse-bit, and superior repeatability, than can be achieved in traditional cold-gas thruster design approaches.

Briefly stated, in one embodiment, a preferred embodiment of microthruster of the invention comprises a normally closed, bistable, no-sliding-fit microsolenoid valve, which is operated to turn the thruster on and off by pulse-width modulation of an electrical command voltage. The solenoid is a flat face, bipole armature type, with a soft (non-metallic) poppet insert for tight shutoff The poppet insert seals on a precision, isotropic-etchant micromachined, silicon seating ring. Four permanent magnets provide closing force, both to return the armature to its valve-closed position following de-energization of the solenoid, and to maintain the poppet seated in the closed position. The permanent-magnet flux field keeps the armature centered, avoiding the use of a sliding fit or a flexure guide.

In another embodiment of the invention there is provided a micromachined valve comprising (a) a valve body defining an interior space, a fluid entrance, and a fluid exit, (b) a selectively energizable electromagnet, (c) an armature comprising a ferromagnetic material and a flow passage providing fluid communication between the fluid entrance and the fluid exit, the armature disposed within the interior space and moveable therein towards the fluid entrance or the fluid exit in response to the presence of a magnetic field from the energized electromagnet, (d) a permanent magnet for moving the armature in a direction opposite the direction in which the armature is responsive to the energized electromagnet, and (e) sealing means between the armature and the fluid entrance or exit effective to seal the fluid entrance or the fluid exit when the armature is moved into fluid sealing abutting relationship therewith.

In another embodiment, the invention provides a microthruster comprising the aforementioned valve and further comprising a nozzle at the fluid exit. In preferred embodiments, the permanent magnet is disposed on the valve body, and most preferably is the portion of the fluid exit from which the valve is formed.

It is expected that microsatellites typically will have between six and twelve microthrusters for orientation corrections, and the microvalves and microthrusters of this invention will provide significant advantage to the designers and builders of such craft. These micromade valve and thrusters will also find use in various other apparatus, including analytical devices, such as gas chromatographs, where control and analysis of small samples of gas are required, and in more robust embodiments for the on-board analysis and control of fuel and exhaust mixtures. In general, the present invention will find utility where small quantities of gas flows need to be metered or controlled.

In another aspect, the present invention provides a valve having no sliding parts associated with the valve body or valve seat (there being no valve stem).

In yet another aspect, the present invention provides a valve, preferably of construction, comprising a filter downstream of the valve seat and upstream of the valve exit (or nozzle in the case of a microthruster). That is, while there are typically filters provided upstream of the valve itself, in the present invention there is a filter adjacently upstream from the most essential component, the nozzle exit of the microthruster, thus alleviating "built-in" contamination.

BRIEF DESCRIPTION OF THE FIGURES

The presently preferred embodiment of the invention will be described in detail in conjunction with the accompanying drawings, in which:

FIGS. 5 and 6 depict, respectively, top and side plan views of a housing for the microthruster of this invention.

FIGS. 7A and 7B are idealized views thereof showing the armature/valve body closed and open, respectively, and FIG. 7C is a close-up of the valve seat in the opened position.

FIG. 9 is a cross-sectional view of a portion of the valve seat and body, and FIG. 9A is an idealized cross-section of the valve seat and body in an open position.

FIGS. 10A and 10B are cross-sectional views of various embodiments of part of the nozzle geometry for a microthruster of this invention.

FIG. 11 is an idealized view of an embodiment of the leaf spring urging the armature opened.

FIG. 12 is an idealized flow diagram of the gas system and the microthruster.

FIG. 13 is an idealized view of a microsatellite in a remote environment incorporating the present invention.

DESCRIPTION OF PARTICULAR EMBODIMENTS OF THE INVENTION

Figure 1:
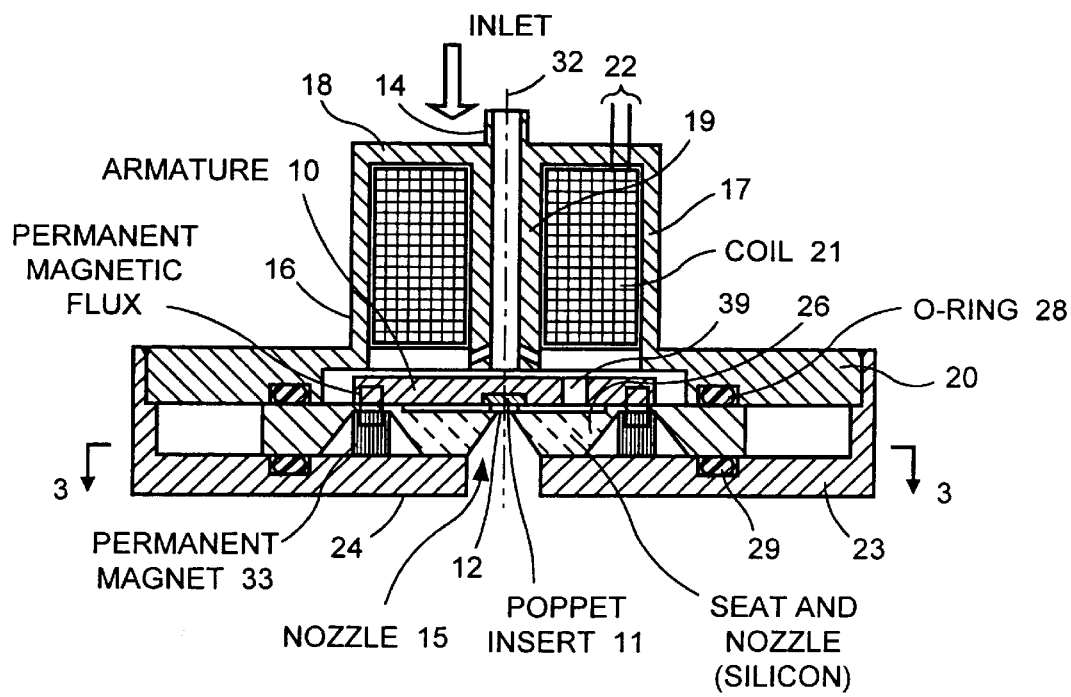
FIG. 1 is a simplified view in longitudinal section and to an enlarged scale of integrated microvalve and micronozzle components of a microthruster of the invention shown for its de-energized or off condition, i.e. no gas flow and no thruster action.

In the drawings, an armature 10 of magnetic-flux conducting material is a flat circular disc having a "soft" central poppet insert 11 "in its lower or downstream surface for coaction with a "hard" annular seat 12 to determine the open or closed condition of valve action, for cold-gas flow between an inlet formation 14 and an outlet or nozzle formation 15; insert (11) is suitably of an elastomeric material. An upper body member 16 of magnetic-flux conducting material comprises a cylindrical cup portion 17 having a magnetically closed upper end 18 which is internally and integrally formed with a central elongate core or stem element 19. The core element (19) is tubular and communicates pressurized gas from inlet (14) to its lower end, which will be seen in FIG. 1 to be in close but spaced relation to armature (10). At its lower end, body member (16) is shown to be integrally formed with a radial flange 20. A solenoid winding 21 is contained within the annular space between the cup portion (17) and the stem element (19) of the core, with leads 22 for external electrical excitation supply to the solenoid winding (21).

The upper body member (16) is fitted to a counterbore in the short cylindrical skirt 23 of a cup-shaped lower body member 24, suitably of stainless steel, such that an internal space $H_1$ (see FIG. 2) is defined by and between the lower face of the flange (20) and the upper face of the closure wall 25 of the lower body member (24).

Figure 3:
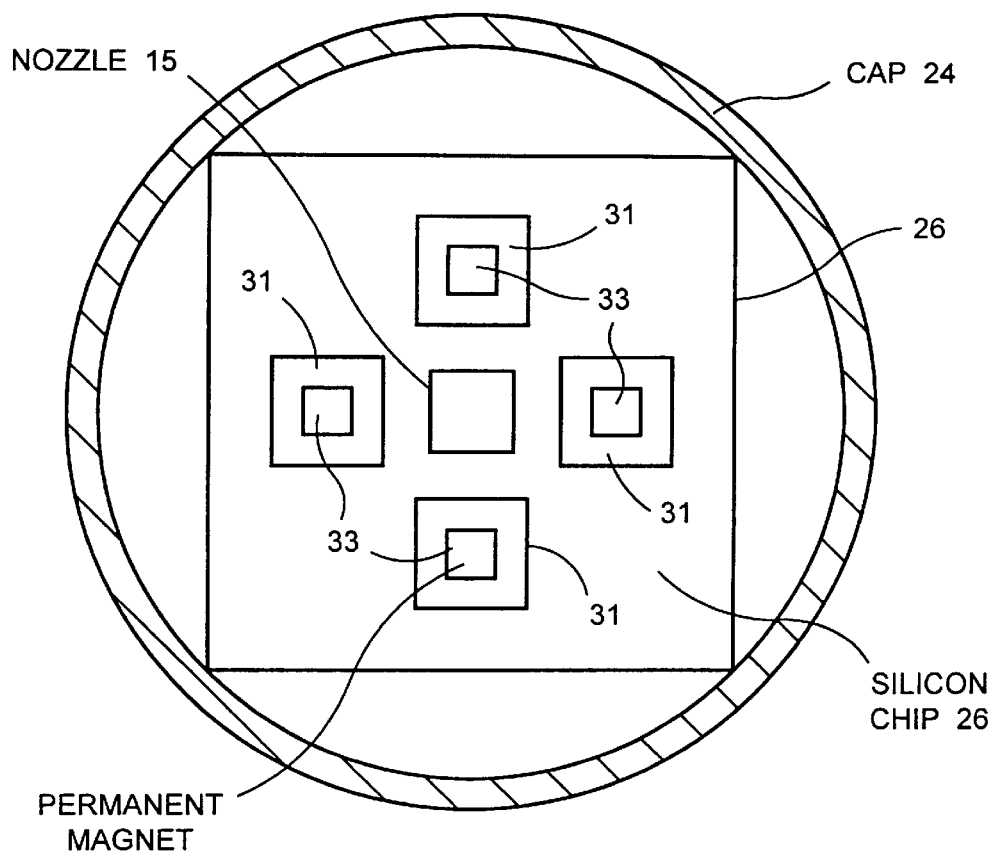
FIG. 3 is simplified view in transverse section taken substantially at the plane 3—3 of FIG. 1.

In accordance with a feature of the invention, this internal space ($H_1$) accommodates the thickness of a silicon chip 26 which in FIG. 3 is seen to be square or rectangular being suitably one of a large plurality of like chips (26) produced by photo-etching techniques familiar to the microelectronics industry. The chip can also be an octagonal, hexagonal, or other regular polygonal planform geometry; octagonal is a preferred geometry because it is easy to manufacture from a typical square starting geometry (the corners of the square being cut off to form the octagon) and fairly approximates the circular geometry of piping and tubing to which the instant devices are typically attached. A peripheral weld 27 permanently retains the closed condition of the entire product, and groove-retained upper and lower elastomeric O-rings 28, 29 provide series redundant circumferentially complete annular sealing of the chip (26) with respect to the flange (20) and cap (24) surfaces between which it is sandwiched; by "series redundant" is meant that the gas must pass through each of the O-rings in series in order for the gas to leak around the device.

The silicon of chip (26) is preferably of single-crystal variety, so that anisotropic etching can develop a precise V-shaped cut and other features of the topography of the chip as shown and described herein. In the case of the chip (26) shown in the instant figures, photo-etching on the lower surface develops a central divergent nozzle formation (at 15) which is of sectionally square configuration as seen in FIG. 3. On its upper face, the chip is further etched to define a central flat 30 that is recessed from the plane of the surrounding circumferentially sealed upper surface of the chip, and the ring-shaped seat (12) is an isotropic micro-machined feature of the silicon chip, incrementally rising above the plane of the flat (30), in its position of surrounding the entrance opening to the divergent shape of the nozzle (15). See, e.g., James B. Angell et al., "Silicon Micromechanical Devices", *Sci. Am.*, April 1983, p. 42–56; and Kurt E. Petersen, "Silicon as a Mechanical Material", *Proc. IEEE*, vol. 70, no. 5, 400–457 (May 1982) (the disclosures of which are both incorporated herein by reference). Thus, depending upon the fabrication technique(s) used, round or rectangular structures can be formed.

The lower surface of the chip (26) is seen further to have been formed to define four like frusto-conical recesses 31 at equally spaced quadrature locations about a central axis 32 of symmetry between the inlet (14) and the outlet (15). Each of four like permanently polarized-magnet elements 33 within the volume of each of the recesses (31), nested with corresponding poles in abutment with the thin-wall section of the silicon chip, adjacent the upper surface of the chip, for 90°-spaced permanent-magnet coaction with the peripheral region of the armature (10).

In the de-energized or unactuated condition shown in FIG. 1, the armature (10) is held by the permanent magnets (33) into abutment with the chip (26), and with the poppet insert (11) in sealed compression against the silicon seat element (12), thus foreclosing any inlet-gas flow to nozzle (15). Solenoid excitation by way of the electrical leads (22) will be understood to seek minimum reluctance via a toroidal path suggested by the broken lines 38 in the core and armature elements (17, 18, 19, 10) of FIG. 2; initially, this will involve traversal of an axially short central circular gap between the armature (10) and the lower end of the core element (19), plus a similarly short axial gap between the armature (10) and the lower end of the cup shaped portion (17), and of course the solenoid derived opening force across both of these short gaps must exceed the total armature-retention force of the permanent magnets (33) and the pressure force ($\Delta P$) across the valve; in the embodiment subsequently described, the flexure force of the leaf spring decreases the opening force necessary to be provided by the solenoid. When thus solenoid-actuated (FIG. 2 position), the poppet insert (11) is raised to clear the seat (12); one or more through passages 39 in the armature place an annular manifold 40 (beneath the solenoid winding (21)) in communication with the now-open inlet of the nozzle (15); and plural generally radial passages 41 near the lower end of the core stem (19) bring pressurized gas from the inlet (14) to the now-continuously open path to and for discharge at supersonic velocity via a nozzle (15).

Figure 4:
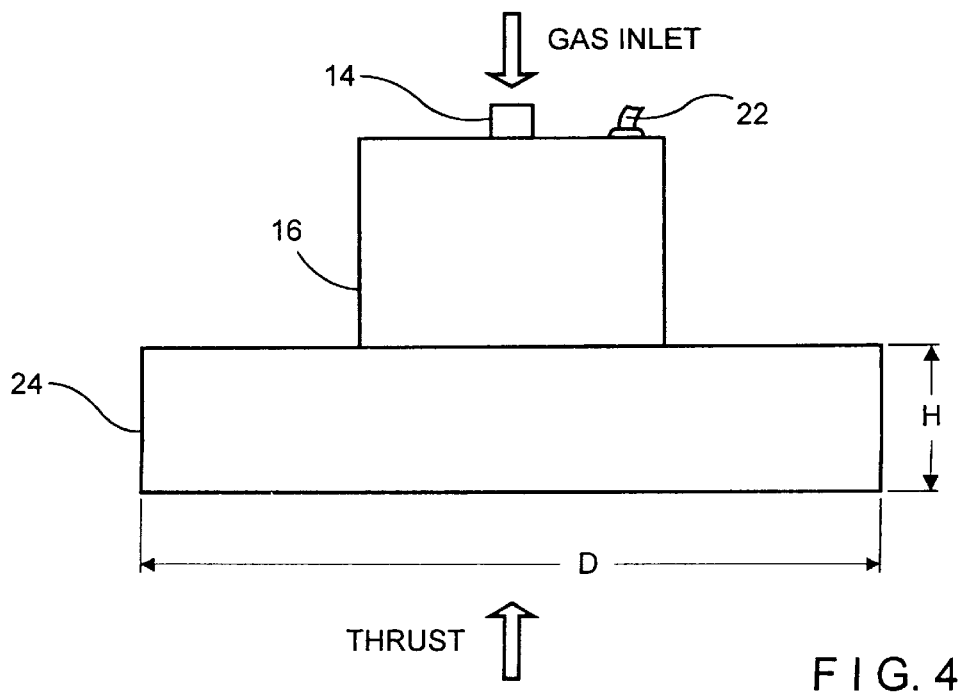
FIG. 4 is a side view in elevation of the microthruster of FIG. 1, with dimensional data to illustrate the extent to which it has been shown enlarged.

The finished article has the appearance depicted in FIG. 4, and with basic illustrative dimensions of height H which may be 0.19 inch and of maximum diameter D of 0.40 inch, for which overall weight is two grams (0.004 lb.), exclusive of the pigtail power leads (22) and mounting provisions (not shown). Peak power is about 2.2 watts (28 vdc, at 68° F.), and the holding power is about 0.3 watt (10 vdc, at 68° F.).

A better appreciation of performance can be obtained from preliminary design analysis of the described microthruster, the same being presented in four tables, of which Table 1 deals with Microthruster Flow Rate, Table 2 deals with Microthruster Design Information, and Table 3 deals with Microvalve Design Conditions, and Table 4 is a Microvalve Design Summary.

TABLE 1

Microthruster Flow Rate

| | | |
|---|---|---|
| 0.001 lb$_f$ | F | Rated Thrust |
| GN2 | | Propellant |
| 1.40 | k | Specific heat ratio |
| 55.2 ft/° R | R | Specific gas constant |
| 3.8839 ft.5/sec | S | Sonic Flow Constant |
| 70 sec | Isp | Specific impulse for nitrogen gas (at (Tn) |
| 0.0000143 lb/sec | W | Rated flow rate (F/Isp) |

TABLE 2

Microthruster Design Information

| | | |
|---|---|---|
| 50 psia | Pn | Valve/Nozzle Inlet Pressure |
| 68 ° F. | Tn | Valve/Nozzle Inlet Temperature |
| 0.065 | Cdn | Nozzle Discharge Coefficient |
| 35.26 degrees δ | | Nozzle Diverging Half Angle |

TABLE 2-continued

Microthruster Design Information

| | | |
|---|---|---|
| 100 | er | Nozzle Expansion Ratio |
| 0.0000193 in² | Ant | Nozzle Throat flow area |
| 0.0044 in | Wnt | Nozzle Slot Throat Width |
| 0.0044 in | Lnt | Nozzle Slot Throat Length |
| 0.04398 in | Lne | Nozzle Exit Length |
| 0.04399 in | Wne | Nozzle Exit Width |
| 0.0280 in | Lnds | Nozzle Diverging Section length |
| 0.0050 in | ESEOD | Equivalent Sharp Edge Ortifice Diameter |

TABLE 3

Microvalve Design Conditions

| | | |
|---|---|---|
| 0.0005 in. | Cp | Poppet Insert Compliance |
| 100% | OS% | Poppet Overstroke |
| 0.0020 in. | L | Seat Land Width |
| 0.0000 in. | Ts | Silicon Thickness |
| 100% | FM | Force Margin, min. |
| 2,000 psi | Ss | Seat Stress, Unpressurized |
| 50 psid | ΔP | Maximum Pressure Drop |
| 10 Kilogauss | Bg | Working Gap Flux Density, (max. @ PI, 70° F.) |
| 64.5 KM/in² | Bg | Working Gap Flux Density, (Max. at P.I., 70° F.) |
| 90% | | Electromagnetic Efficiency |
| 0.005 in. | Tl | Coil Insulation Thickness |
| 1 (Fixed) | Apo/Api | Outer Pole Area/Inner Pole Area |
| 0.150 in. | ODc | Coil Outside Diameter |
| 2 | ARw | Window Aspect Ratio (Length/Width) |
| 68 °F. | Tr | Room Temperature |
| 212 °F. | Th | High Temperature |
| 35.5 vdc | Emax | Maximum Voltage |
| 16 vdc | Emin | Minimum (Pull-in) Voltage |
| 28 vdc | En | Nominal Voltage |
| 10 vdc | Eh | Holding Voltage |
| 0.05 | μ | Coefficient of Friction (430CRES/Si) |
| 1.3 | r | Flux Leakage Factor |

TABLE 4

Microvalve Design Summary

| | | |
|---|---|---|
| 0.00722 in. | Dsid | Seat Internal Diameter |
| 0.00220 in | Xpd | Design Poppet Stroke |
| 0.0157 in. | Difh | Coaxial Inlet Flow Hole Dia. (Optional) |
| 0.00220 in. | Lg | Total Working Gap |
| 0.054 in. | Dpi | Inner Pole Diameter |
| 0.159 in. | Dpo | Armature Diameter |
| 0.013 in. | Ta | Armature Diameter |
| 0.106 in. | Lw | Window Length |
| 0.116 lb | Fm | Mech. Load (Due Permanent Magnets) |
| 0.003 lb | F | Pressure Unbalance Force, Max. |
| 0.119 lb | Fpt | Total Unbalanced Force on Poppet, Max. |
| 0.238 lb | Fpt | Solenoid Design Force |
| 58 psi | Sg | Magnetic Gap Stress at Max. Load |
| 1520 turns | Nc | Coil Wire Turns |
| 35 ma | Ipi | Pull In Current |
| 1.69 watts | Ppi | Power at High Temperature, Min. (P) Voltage |
| 79 ma | Ir | Current at Room Temperature, Nom. Voltage |
| 2.22 watts | Pn | Power at Room Temperature, Nom. Voltage |
| 28.4 ma | Ih | Current at Room Temp., Holding Voltage |
| 0.284 watts | Ph | Power at Room Temperature, Holding Voltage |
| 1460 g | Gra | Axial Vibration Resistance |
| 73 g | Grl | Axial Vibration Resistance, Closed |
| 0.0001 sec | ti | Nom. Inductive Lag Estimate, Opening |
| 49.50 | AWG | Coil Wire Size |
| 49.50 amp-turns | Nlr | Amp-Turns Required |
| 52.5 amp turns | Nla | Actual Amp turns at Min. (P1) Voltage, Hi Temp. |

Table 1 summarizes the flow-rate determination analysis. This has assumed a specific impulse of 70 seconds for room-temperature operation. This is of course a function nozzle design, which has yet to be optimized.

Table 2 summarizes the Microthruster design conditions and design configuration information. This applies to the simple, anisotropically etched, square cross-section, four-straight-sided, diverging-section nozzle configuration shown in the drawings. Gas flow is sonic (choked) in the nozzle throat, and expands to supersonic velocity in the diverging section of the nozzle, creating thrust as it exits the nozzle. The hole in the metal cap (24), which conforms to the square shape of the nozzle exit, is designed to eliminate the non-axial thrust component. And note that a conservative discharge coefficient (Cd) value, 0.65, is used.

Table 3 lists preliminary Microvalve design and analysis input conditions, and attention is drawn to the fact that certain estimates have been made to facilitate the preliminary design analysis. For example, the electromagnetic efficiency (e) and flux-leakage factor (r) are conservatively estimated at 90% and 1.3, respectively. These will be later calculated using rigorous computer simulations of mathematical models of the solenoid actuator and valving. Note that the 2000-psi unpressurized seat stress (Ss) actually represents an unbalanced load that will be reacted at both the seat and the armature stop on the silicon.

Table 4 summarizes the preliminary design characteristics, both performance and sizing, of the Microvalve. Note that the power is estimated at 0.284 watts at a "holding" voltage. It is believed that it will be advantageous to reduce the nominal voltage (say, 28 vdc) to a holding voltage (say, 10 vdc) to reduce power during longer firing durations, as a preliminary step, to facilitate thermal management and thus to assure against overheating the solenoid winding (21).

Figure 2:
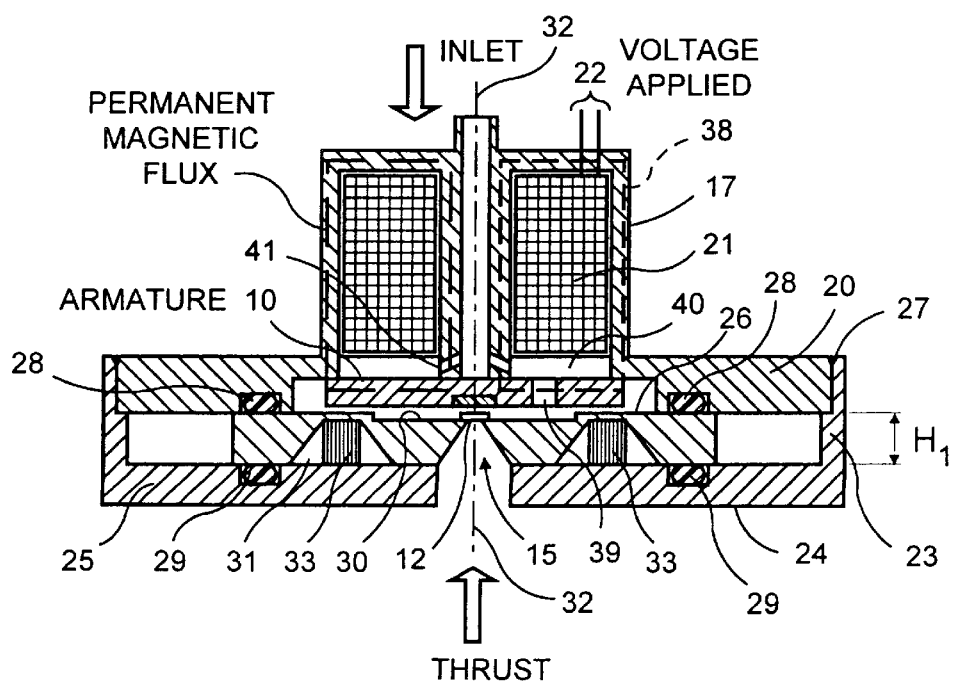
FIG. 2 is a view similar to FIG. 1, for the energized or thruster-on condition.

For a pulsing (dynamic) operation, Table 4 indicates a 0.0001-second (0.1 ms) nominal inductive-lag estimate for time to open the valve; and assuming a similar time for armature motion (i.e. from the FIG. 1 to the FIG. 2 relation, the total valve-opening time is about 0.0002 second (0.2 ms). Even considering the approximate nature of this estimate (which did not include such factors as eddy-current effects), there is no doubt that the microvalve response will be well under 0.0005 second (0.5 ms). Given a reasonably high back-emf-suppression level (say, 100 volts), the valve-closing time is expected to be even faster. This will provide extremely small and repeatable impulse bits, i.e. bits that are smaller and more precise than ever before achieved.

The described Microthruster construction will be seen to meet the stated object. In the normally closed (thruster-off) position of FIG. 1, the poppet insert seals on a seating ring which has been micro-machined in the silicon chip, a precision isotropic etchant micromachining operation. The four permanent magnets, embedded in the silicon seat die near the outside of the armature, provide closing force to maintain the poppet seated in the normally closed position. The permanent magnet flux field also keeps the armature centered, avoiding the use of a sliding fit or a flexure guide.

Application of inlet gas pressure seats the poppet more firmly onto the seat.

In the energized open (thruster-on) position of FIG. 2, the thruster is turned on by electrically energizing the solenoid coil, which opens the microvalve and permits gas flow to the micronozzle. Opening-direction force is created at both the inner armature pole and the outer annular armature pole, the flux path being noted in FIG. 2.

The micronozzle (15) of the thruster is micromachined in the lower surface of the silicon chip (26), directly below the silicon valve seat (12). The micronozzle is a simple, anisotropically-etched feature of divergent square cross-section (four straight-sided). Gas flow is sonic (choked) in the nozzle throat, expanding to supersonic flow in the divergent section of the nozzle, thus creating thrust in a direction opposite to that of the gas flow.

De-energization of the solenoid coil closes the valve and turns off the thruster (back to FIG. 1). The permanent-magnet-closing force returns the armature and valve to closed position, maintains the valve closed, and also keeps the armature centered (avoiding the use of a sliding fit or a flexure guide). Note that the outer edge of the armature contacts the surface of the silicon seat/nozzle die. This armature stop provides two functions: (1) it precisely controls the squeeze of the elastomer poppet insert into the silicon seating ring, thus limiting the compression set of the material, and (2) it absorbs closing impact loads, thus preventing excessive impact, and possible deterioration, of the poppet insert material.

The microthruster is all-welded to prevent external leakage. The inlet port is shown as a stainless-steel microtube stub for attachment to supply plumbing, or for connection to a distribution manifold. An electrical pigtail will connect to the spacecraft driver circuit (not shown).

The solenoid is a flat face, bipole armature type. The coil is preferably wound and potted on a Vespel plastic bobbin using very fine enamel-insulated, copper magnet wire; one preliminary design has 1500 turns of AWG 50 (0.001 in. dia.) wire. Gas propellant flow is coaxial through the center of the solenoid core, cooling the solenoid while increasing the propellant temperature and improving rocket performance. The solenoid core and armature are preferably made of magnetically annealed 430 CRES (stainless-steel).

The valve poppet is a low-compression set, elastomer insert, molded into the CRES armature.

The poppet insert seals on the precision isotropic etchant micromachined silicon seating ring, and note that the silicon seat/nozzle assembly is cushioned between two O-rings to control "metal-to-silicon" loading and to avoid damage to the silicon material. These O-rings also provide redundant sealing of the supply gas.

Another embodiment of a housing for the present microthruster is shown in FIGS. 5 and 6, respectively top and side plan views, in which the housing comprises an upper body portion 50, a flanged portion 52, and a lower body portion 54. Gas, typically nitrogen, or an inert gas such as xenon, is provided to the device through inlet tube 56 having an end distal from the body also having a flange portion 58 to facilitate connection with the gas supply. The electrical connection is made through two lead pins 60 disposed in the upper body portion.

Figure 7:
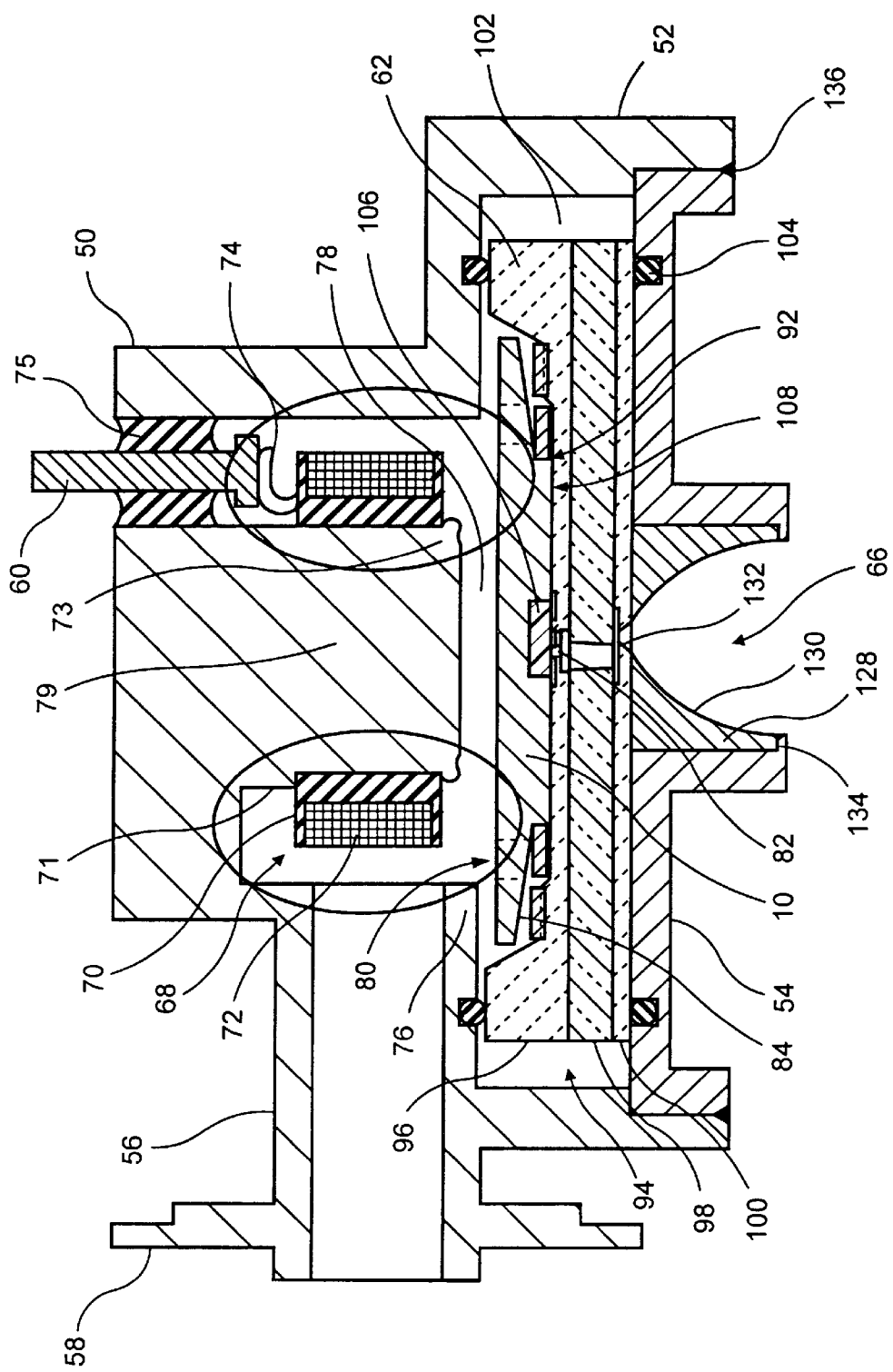
FIG. 7 is a cross-section taken along line 7—7 of FIG. 5.

The structure and operation of this embodiment is seen more clearly in FIG. 7, from lines 7—7 taken vertically along the housing shown in FIGS. 5 and 6. As described before, the housing (50, 52, 54) defines an interior space in which an armature 62 is disposed for movement between a fluid entrance 64 and a fluid exit 66. The armature is preferably comprised of a magnetically permeable, preferably ferromagnetic material, most preferably a stainless steel composition (e.g., 430 grade); the lower housing is preferably made of a non-magnetic material (e.g., 304L stainless steel); the upper housing is preferably made of a ferromagnetic material (e.g., 430 stainless steel). The armature (10) is subjected to a magnetic field created by a selectively energizable electromagnet as suggested by ellipses in FIG. 7. A suitable selectively energizable magnet is a solenoid-type electromagnet 68 formed from a bobbin 70, preferably comprising an electrically insulating material, about which are a number of turns of a coiled wire circuit 72 powered through a lead 74 connected to each of the lead pins (60). See, e.g., Herbert C. Roters, *Electromagnetic Devices* (New York: John Wiley & Sons, Inc., 1941) (the disclosure of which is incorporated herein by reference) for a discussion of solenoid design considerations. The bobbin is retained in place between a shoulder 71 formed from a portion of the core of the upper housing and a peened internal foot 73 of the upper housing. The pins are isolated from the upper housing (50) by a high dielectric, insulating material 75 disposed about the pin. The device in FIG. 7 is shown with the coil de-energized such that the armature is urged downward in the reference perspective of the figure. When the coil is energized, the armature is urged upward and is controlled in its upward movement by a stop 76 formed essentially from the upper housing (50, 52) so that, at the top of its travel, a gap 78 remains between armature (62) and the core 79 formed from the upper housing (50) and around which the activatable magnet is wound. Accordingly, it will be appreciated that in the embodiment shown, the configuration is normally closed. In such an energized, open position, the gas from the supply having a defined pressure at the fluid inlet (64), typically 300 psi or more can be used with the present design, flow through one or more flow ports 80 disposed in the armature; because the armature is round, cylindrical, various design may include a number of ports disposed circumferentially about the armature. The gas flow then flows through a valve seat 82 and associated flow channels (described below in more detail) to the discharge (66). FIG. 7A is an idealized view of the valve in the closed position as shown in FIG. 7. FIG. 7B is an idealized view of the valve shown in FIG. 7 in the opened position, with the armature (10) moved upwards abutting the stop (76). FIG. 7C is a closer view of the valve seat and etched gas flow path leading to the exit and shown in further detail, although idealized, in FIG. 8.

The magnetic field generated by the solenoid, shown by the heavy elliptical line in FIG. 7 around each of the bobbin cross sections, generally passes through the housing and has a reluctance across the gap (78) between the armature and the central core (79), the gap between the armature and the stops (76), and the inlet tube (56). The permanent gap (78) allows for a quicker release of the armature when the solenoid is de-energized. From a practical point of view, the thermally actuated devices of the prior art have a response time on the order of hundreds of milliseconds, whereas the response time of the inventive microvalve is on the order of 1–2 ms. Another advantage of the present invention is that the magnet field lines for each section of the solenoid pass through the armature (10) twice, once in the area of the central core (79) and one in the area of the stop (76), thereby effectively increasing the force applied to the armature.

When energized, the armature (62) is guided to the open position by a guide means 84, preferably of non-sliding fit type. Shown in more detail in FIG. 11, the preferred embodiment of the guide means (84) is a sheet of metal, preferably non-ferromagnetic (such as a stainless steel) stamped, machined, or photoetched to provide a number of arms 86 configured as leaf springs urging the main body 88 of the guide upwards. The main body (88) includes a guide opening 90, preferably of circular geometry, and adapted to engage a cylindrical neck 92 on the armature (62). Thus, the force of the guide is directed to the armature (62) portion to which the neck (92) is attached, slightly urging the armature upwards in the reference frame of FIG. 7. An advantage of the geometry of the leaf spring guide means is that the structure is very stiff in the plane of the metal, and so prevented from deforming, yet flexible in the direction of travel of the armature, orthogonal to the plane. Further, this design provides for a moveable valve body that is guided between opened and closed positions without any type of sliding fit mechanism to guide the travel of the valve body (i.e., the armature).

The armature (62) shown in FIG. 7 sits on a multilayer body 94 having a valve seat portion 96, an intermediate flow channel portion 98, and a flow exit portion 100. Preferably, the valve seat and flow exit portions are comprised of single crystal silicon, and the intermediate layer is a glass, preferably a borosilicate glass, most preferably available from Dow Corning as grade 7740. The valve seat portion (96) is preferably photoetched (using well-known semiconductor manufacturing techniques) to provide a well 102 adapted to accommodate the armature (62) and the guide means (84). The multilayer body (94) is preferably disposed within an interior space 102 defined by the upper (50, 52) and/or lower (54) portions of the housing. The multilayer body (94) is secured within the space (102), preferably by vibration absorbing elements, more preferably by elastomeric O-rings or gaskets 104 formed of a material such as a fluoroelastomer, most preferably VITON (such as grade E60C, available from DuPont de Nemours & Co., Wilmington, Del.), FLUOREL (such as grade 2141), or KEL-F (the latter two both available from 3M Company, St. Paul, Minn.), that preferably can be vulcanized in place and then ground flat with the bottom portion of the armature.

An embodiment of the valve seat portion is shown in further detail in FIG. 9, in which the valve is shown in a closed position on the seat. The armature (62) preferably comprises a valve seat seal 106 disposed centrally in the armature, preferably also comprised of a fluoroelastomer, and which can be polymerized in situ in a related bore or insert in the armature. The valve seat seal is preferably also a fluoroelastomer of the type used for the gaskets and O-rings, and preferably has a hardness of about 90 durometer in the present embodiment. The bottom well surface 108 of the valve seat portion (96) of the multilayer body (62) is preferably formed by photoetching to reside below a raised valve seat 110 formed from the valve seat portion (96). When the valve is closed, closing force of the armature causes the valve seat (110) to compress a portion of the valve seat seal (106) to assure a leak free, secure seal of the valve port 112. To further this compressive effect, FIG. 9A depicts the same view with the valve opened, in which it can be seen that the valve seat seal (106) has a substantially flat surface on which to seal the valve seat.

Figure 8:
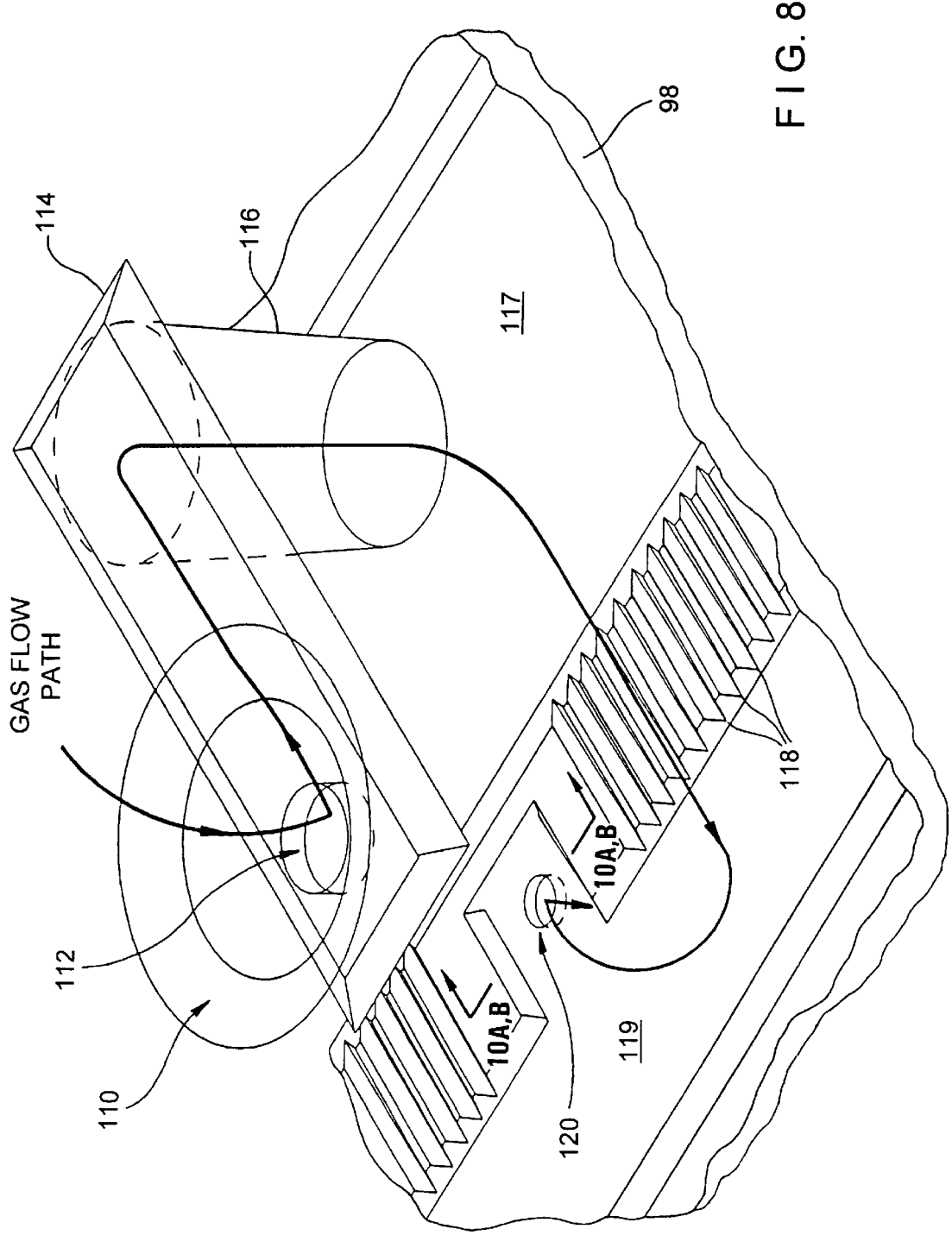
FIG. 8 is an idealized perspective view of the flow path of the gas from the valve seat to the nozzle in one embodiment of the invention.

With reference to FIG. 8, a depiction of an idealized perspective of the gas flow path between the valve seat and the gas discharge, the gas passes over the seat (110) and through the port (112), across a photoetched plenum 114 disposed in the surface of the valve seat portion (96) adjacent the intermediate layer (98) of the multilayer body (62). The gas then flows through a downcomer 116, preferably fluidized particle abraded hole (analogous to a sand blasted hole, but made on the micromachining scale) formed in the intermediate glass layer (98). Upon exiting the downcomer the gas then flows into a feeder manifold 117 in the exit portion, parallel through a series of comb filters 118 photoetched into the surface flow exit portion (100) of the multilayer body (62) adjacent the intermediate layer (98), out to the exit manifold 119, and finally out through a flow exit port 120; the comb filters are described more fully in the above-referenced, co-filed application for a micro gas rheostat. In brief, the filters are designed to filter particles from a size of larger than the exit port (120) that would cause clogging, about 2 mils preferably, down to those of less than one-half of the nozzle area, about 0.5 mil preferably. The dimensions of the filters are on the order of a 1 mil opening at the top with side walls forming the complement of an angle of 35.260 with the horizontal to provide a isocelean triangular cross-section.

Thus, this invention provides one or more filters for the gas flow through the valve, preferably wherein the filters reside just upstream of the valve exit or the nozzle entrance, depending upon one's frame of reference. Typically, internal filters are impractical or essentially impossible because of the large volume required to house the filter elements. With large volumes, there is a significant amount of time before the system is fully pressurized, and after the valve closes the gas present in the large volume typically dribbles out from the valve (usually called a dribble volume). The capacitance of the large filter volume degrades the desired crisp step-like waveform. In the present invention, the very small volume required for the filter allows for a crisp, step-like waveform in the pressure profile, leading to a controllable response for the microvalve or microthruster. Further, the present method enables one to fabricate devices having tiny nozzles, having a opening with a throat dimension on the order of 2.0 mil or less. The conventional semiconductor fabrication steps such as etching and anodic bonding are performed in clean rooms and are typically very clean operations; micromachined parts usually can be assembled with minimal contamination. The main problem is that once the chip parts are bonded together, the wafer is cut (typically with a diamond saw) generating contaminating fines. The present device overcomes this problem by placing an "end-point" filtration device within the valve. This end-point filtration is most beneficial against problems caused by self-contamination; for example, fines generated when the three part body was cut from wafers, particles that might break off from the valve seat or seal, and other particles that might enter the system and avoid removal by other filtering devices that are used in typical locations.

As has now been described, the invention provides a microvalve having a housing providing a fluid inlet and a fluid outlet, an interior space in which an actuatable valve body, the armature, is disposed. The valve body is actuated by a selectively energizable magnet, such as a solenoid, and a valve seat is provided for abutting, sealing relation with a portion of the valve body.

In another embodiment, the microvalve can be modified to provide a microthruster, essentially by modifying the fluid exit to produce a nozzle at the discharge. Shown in more detail in FIGS. 10A and 10B, in idealized cross-sections taken along line 10—10 in FIG. 8, the discharge (120) can be provided with a straight walled exit 122 leading to a diverging nozzle 124 as in the former figure, or the discharge can be immediately adjacent the nozzle 126 as in the latter figure. Since the gas discharge portion (98) is preferably made of silicon, the nozzle lacking the straight wall can be formed by photoetching the discharge (120) and the nozzle (126) until their etched walls meet.

Returning to FIG. 7, the nozzle (124 or 126) disposed in the flow exit portion (98) of the multilayer body is in abutting relation with a nozzle extension 128 having a nozzle extension wall 130 contiguous with the nozzle wall 132 formed in the bottom portion of the multilayer body. The nozzle extension is placed into the lower housing (54) and retained therein by shelf 134. The nozzle extension is preferably dropped into the lower housing section and the top is ground flat with the upper surface of the lower housing that abuts the bottom of the multilayer body. The nozzle extension is preferably made of a magnetic or magnetized material, most preferably a magnetizable rare earth magnet having a composition such as samarium cobalt or neodymium boron iron, having a nozzle structure formed by EDM (electric discharge machining). In such preferred embodiments where the nozzle extension (128) comprises a magnetic material, the nozzle extension functions as a permanent magnet urging the armature/valve body into a closed position on the valve seat; downward from the frame of reference depicted in FIG. 7. A gas flow through an orifice can be engineered to be a sub-sonic or a sonic velocity (e.g., chocked flow), and can be made supersonic with a nozzle, wherein the divergent section can increase the velocity to Mach 7 or more. Since the thrust force is a function of the gas velocity (the momentum of the thrust gas being the mass of the particles multiplied by their velocity), increasing the gas velocity decreases the amount of mass needed for a given thrust.

Using the aforementioned magnetic materials, the nozzle extension can be magnetized or de-magnetized to control the absolute closing force on the armature. That is, after the device is assembled, the guide means will provide a small force urging the armature into the open position. The magnetic force generated by the nozzle extension is then selectively altered to provide a desired closing force less than the opening force provided by the energized coil. The magnetization of the extension is adjusted by a fixture having a magnetic coil into which the thruster fits via the lower housing; the nozzle extension resides in the fixture between two poles a current is applied to the fixture's coil to increase the closing force by magnetizing the extension; the magnetization can be decreased by demagnetizing the extension (by reversing the polarity applied to the fixture's coils). The nozzle extension magnetization is adjusted to less than the force of the solenoid on the armature, less the pressure drop across the armature (tending the keep the valve in a closed position), and plus the minor force of the flexure guide slightly urging the armature to the opened position.

The lower housing (54) is permanently attached to the upper housing (50, 52), such as by a weld 136. The weld is preferably formed by a laser beam; an electron beam is not suitable when the nozzle extension is present as a permanent magnet that would interact with the electron beam.

In operation in a (micro)satellite, with reference to FIG. 12, the satellite includes a tank 140 housing a supply of (e.g., nitrogen or xenon) gas which flows through a filter 142 and is simply regulated by a latching (on/off) valve 144. The gas supply is regulated down to 300 psi, although it can be regulated to as low as about 5 psia, by a regulator 146 that leads to a header 148 to which the microthruster inlet tube are connected. From the header a number of feed lines 150 conduct the gas flow to the microthrusters. As shown schematically, each microthruster preferably comprises a filter 152, preferably a 15 $\mu$m wire cloth filter, through the microvalve 154 of this invention, then through another filter 156, such as the microcomb filter (119), and finally out through the nozzle 158.

As has now been described, the invention provides a microthruster including the aforedescribed valve, the outlet of which is provided with a nozzle to focus the thrust. As such, as shown in FIG. 13, the microthruster 160 is useful in combination with a microsatellite 162 used, for example, with remote-sensing radiation sensitive instrumentation having a window 164 through which such radiation passes in the remote sensing of a planet 166 or other heavenly body such as the plantet's moon 168.

Typical operating parameters and conditions are shown in Table 5.

| Value | Units | Abbreviation | Description | units |
|---|---|---|---|---|
| Microvalve Flow Sizing | | | | |
| 300. | psia | P1 | upstream valve pressure | |
| 1. | psid | ΔP1-P2 | pressure drop at rated flow | |
| 299. | psia | P2 | downstream valve pressure | |
| 68 | °F. | T1 | upstream valve temperature | |
| 20.51E-6 | in² | CAv | effective flow area of valve | |
| 0.60 | | Cv | discharge coefficient of valve | |
| 34.18E-6 | in² | Av | phisical minimim flow area in vlave seat/poppet | |
| 0.00585 | in. | Sv | square seat hole dimension/side | 148 $\mu$ |
| 0.00660 | in. | ESEOD | equiv. sharp edge orifice valve dia. | 168 $\mu$ |
| MicroNozzle Flow Sizing | | | | |
| 299 | psia | P3 | valve/nozzle inlet pressure | |
| 0 | psia | Pa | ambient pressure | |
| 68 | °F. | T3 | valve/nozzle inlet temperature | 20° C. |
| 2.45E-6 | in² | CAn | effective flow area of nozzle | |
| 0.60 | | Cn | nozzle discharge coefficient | |
| 4.08E-6 | in² | An | physical flow area of nozzle throat | |
| 2.02E-3 | in | Snt | square Nozzle throat dimension | 51 $\mu$ |
| 2.28E-3 | in | Dn | "equivalent" nozzle diameter | 58 $\mu$ |
| 200 | | er | nozzle expansion ratio | |
| 816E-6 | in² | Sne | square nozzle exit dimensions | 726 $\mu$ |
| 0.0188 | in | Ln | nozzle length (centerline) | 477 $\mu$ |
| Electromagnetic Analysis Inputs | | | | |
| 0.0007 | in. | Cp | poppet-insert compliance | 18 $\mu$ |
| 100% | | OS % | poppet overstroke | |
| 0.0010 | in. | Ts | drop out gap | 25 $\mu$ |
| 1,000 | psi | Ss | seat stress, unpressurized | |
| 9.30 | kilogauss | Bgi | inner pole gap flux density | |
| 90% | | e | electromagnetic efficiency (Total NI/Inner Pole .NI) | |
| 50 | °F. | ΔT | self-heating estimate | |
| 32 | Vdc | Emax | max. actuation voltage | |
| 18 | Vdc | Epi | Max. pull-in voltage at rated supply pressure, max. coil temperature (≈ 172° F.) | |
| 28 | Vdc | En | nominal actuation voltage (±4 Vdc) | |
| 10 | Vdc | Eh | nominal holding voltage (±1 Vdc) | |
| Microvalve Design Summary and Detailed Analysis | | | | |
| 0.00927 | in. | Dsid | seat internal diameter | 235 $\mu$ |
| 0.00305 | in. | Xpd | design poppet stroke, outer pole gap | 77 $\mu$ |
| 0.00405 | in. | Lg | total working gap, center pole | 103 $\mu$ |
| 0.276 | in. | Dpo | armature diameter | 7 mm |
| 0.028 | in. | Ta | armature thickness | .71 mm |
| 0.474 | lf | Fpt | solenoid design force | 215.2 g |
| 201 | ma | Ipi | pull in current | |
| 8.77 | watts | Ppi | power @ high temp, min (PI) volt. | |

-continued

| Value | Units | Abbreviation | Description | units |
|---|---|---|---|---|
| 384 | ma | Ir | current at romm temp., nom. voltage | |
| 10.75 | watts | Pn | power at room temp., nom. volt. | |
| 137 | ma | Ih | current at room temp., holding volt. | |
| 0.00927 | in. | Dsid | seat internal diameter | |
| 0.0133 | in. | Dsid | seat diameter, mean | |
| 0.00117 | in. | Xps | net poppet-to-seat opening | |
| 0.00117 | in. | OS | poppet overstroke | |
| 0.00305 | in. | Xpd | design poppet stroke, outer pole gap | |
| 205E-6 | in$^2$ | Aifh | coaxial inlet flow hole area | |
| 234E-6 | in$^2$ | Asp | seat unbalanced area (based on seat OD) | |
| 0.167 | lb | Fm | mechanical load (permanent magnet) | |
| 0.474 | lb | Fkpt | solenoid design force | |
| 0.00948 | in.2 | AKpt | total armature pole area | |
| 0.00948 | in$^2$ | Api | inner pole area | |
| 0.0285 | in$^2$ | Apo | outer pole area | |
| 0.00405 | in. | Lg | total working gap, center pole | |
| 0.163 | in. | MDc | mean coil diameter | |
| 294 | in. | Lcw | length of coil wire | |
| 73 | ohms | Rcr | room temp. coil reisitance | |
| 89 | ohms | Rch | high temp. coil resistance | |

While the inventive microthruster has been described as an improved microvalve for use in a microsatellite in preferred embodiments, it will be appreciated that the inventive microvalve and microthruster are suitable for other applications employing gas instruments and gas and liquid control systems such as gas chromatographs and medical instrumentation. Whereas the prior art thermally-actuated devices are not suitable for liquid flows because of the significantly higher heat capacity of liquids (which tend to cool the thermal actuator), the present invention is not so limited. However, when used with liquid systems, it is preferred to isolate the solenoid coil (72) and/or bobbin (70) from the liquid fluid stream.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A micromachined microvalve, comprising:
    a. a valve housing defining an interior space, a fluid entrance, and a fluid exit;
    b. a selectively energizable magnet;
    c. an armature comprising a ferromagnetic material, the armature disposed within the interior space and displaceable therein between the fluid entrance and the fluid exit in response to the presence or absence of a magnetic field from the energized magnet, said armature being sized relative to said interior space such that, during a portion of said displacement, a clearance is established between the entire outer surface of said armature and said inner surface of said valve housing;
    d. a permanent magnet for urging the armature in a direction opposite to the direction in which the armature is responsive to the energized magnet, said permanent and selectively energizable magnets being positioned relative to said valve housing to maintain said armature in a predetermined transverse alignment relative to the direction of said displacement throughout said clearance-established portion of said displacement; and
    e. a valve seat disposed between said armature and said fluid entrance or said fluid exit effective to seal the fluid entrance or the fluid exit when the armature is displaced into fluid sealing abutting relationship with the entrance or the exit.

2. The microvalve of claim 1, wherein the valve housing comprises an upper portion and a lower portion, the upper portion comprising a fluid entrance communicating with the interior space.

3. The microvalve of claim 1, further comprising a guide means disposed about a portion of the armature.

4. The microvalve of claim 1, further comprising a body disposed in the interior space, said body having a fluid flow path provided therein, said body disposed between said armature and said entrance or exit and including said valve seat.

5. The microvalve of claim 4, wherein said body is a multilayer body.

6. The micovalve of claim 1, wherein the valve seat opens into a nozzle.

7. The microvalve of claim 6, further comprising a nozzle extension.

8. The microvalve of claim 1, further comprising means for guiding said armature between said fluid entrance and said fluid exit.

9. The microvalve of claim 6, wherein the lower housing comprises a non-magnetic material.

10. A micromachined microvalve, comprising:
    a. a valve housing defining an interior space, a fluid entrance, and a fluid exit;
    b. a selectively energizable magnet;
    c. an armature comprising a ferromagnetic material, the armature disposed within the interior space and displaceable therein between the fluid entrance and the fluid exit in response to the presence or absence of a magnetic field from the energized magnet;
    d. a permanent magnet for urging the armature in a direction opposite to the direction in which the armature is responsive to the energized magnet; and
    e. a valve seat disposed between said armature and said fluid entrance or said fluid exit effective to seal such fluid entrance or the fluid exit when the armature is displaced into fluid sealing abutting relationship with the entrance or the exit, wherein the valve seat comprises a photoetched single crystal material.

11. A microvalve, comprising:
    a. a valve housing defining an interior space, a fluid entrance, and a fluid exit;
    b. a selectively energizable electromagnet;
    c. an armature comprising a ferromagnetic material, the armature being disposed within the interior space and displaceable therein between the fluid entrance and the fluid exit in response to the presence or absence of a magnetic field from the energized electromagnet;
    d. a permanent magnet for urging the armature in a direction opposite to the direction in which the armature is responsive to the energized electromagnet;
    e. a valve seat disposed between said armature and said fluid entrance or said fluid exit effective to seal the fluid entrance or the fluid exit when the armature is displaced into fluid-sealing abutting relationship with the entrance or the exit; and
    f. a multilayer body disposed in the interior space, said body having a fluid-flow path provided therein, said body including said valve seat. said body being disposed between said armature and said entrance or exit which is effectively sealed by said valve seat; and said body comprising three layers, the outer two comprising a single crystal material and the inner layer comprising an amorphous or polycrystalline glass, said layers being bonded integrally together.

12. The microvalve of claim 11, wherein the single crystal material is selected from the group consisting of silicon and gallium arsenide.

13. The microvalve of claim 11, wherein the flow path is selected from the group consisting of a micromachined fluid-flow path, a microetched fluid-flow path, and a fluid-flow path including micromachined and microetched portions.

14. The microvalve defined by claim 13, wherein said flow path comprises microetched filters effective for filtering particles from the flow therethrough.

15. The microvalve of claim 7, wherein the outer two layers are of single-crystal silicon and the inner layer is of borosilicate glass.

16. A microvalve, comprising:
  a. a valve housing defining an interior space, a fluid entrance, and a fluid exit;
  b. a selectively energizable electromagnet;
  c. an armature comprising a ferromagnetic material, the armature disposed within the interior space and travelable therein between the fluid entrance and the fluid exit in response to the presence or absence of a magnetic field from the energized electromagnet;
  d. a permanent magnet for urging the armature in a direction opposite to the direction in which the armature is responsive to the energized electromagnet;
  e. a valve seat of photoetched single-crystal material disposed between said armature and said fluid entrance or said fluid exit effective to seal the fluid entrance or the fluid exit when the armature is moved into fluid sealing abutting relationship with the entrance or the exit; and
  f. a body disposed in the interior space, said body having a fluid-flow path provided therein, said body disposed between said armature and said entrance or exit and including said valve seat; and said valve seat comprising a combination of an elastomeric material carried by said armature and positioned to abut a valve seat formation disposed on said body adjacent thereto.

17. The microvalve of claim 16, wherein the flow path is selected from the group consisting of a micromachined fluid-flow path, a microetched fluid-flow path, and a fluid-flow path including micromachined and microetched portions.

18. The microvalve defined by claim 16 wherein said selectively energizable magnet is an electromagnet, said microvalve constituting a part of a microthruster, said microthruster comprising a source of pressurized gas in fluid communication with the fluid entrance of said microvalve, said microthruster further comprising an electrical supply for energizing the electromagnet.

19. The microvalve of claim 18 wherein said microthruster constitutes a part of a microsatellite.

20. A micromachined microvalve, comprising:
  a. a valve housing defining an interior space, a fluid entrance, and a fluid exit;
  b. a selectively energizable magnet;
  c. an armature comprising a ferromagnetic material, the armature disposed within the interior space and displaceable therein between the fluid entrance and the fluid exit in response to the presence or absence of a magnetic field from the energized magnet;
  d. a permanent magnet for urging the armature in a direction opposite to the direction in which the armature is responsive to the energized magnet; and
  e. a valve seat disposed between said armature and said fluid entrance or said fluid exit effective to seal such fluid entrance or the fluid exit when the armature is displaced into fluid sealing abutting relationship with the entrance or the exit, wherein the valve seat opens into a nozzle having a nozzle extension, the nozzle extension being a magnetized or magnetizable material.

21. The microvalve of claim 20, wherein the nozzle extension is magnetic.

22. The microvalve of claim 20, wherein the nozzle extension is selectively magnetizable.

23. A micromachined microvalve, comprising:
  a. a valve housing defining an interior space, a fluid entrance, and a fluid exit;
  b. a selectively energizable magnet;
  c. an armature comprising a ferromagnetic material, the armature disposed within the interior space and displaceable therein between the fluid entrance and the fluid exit in response to the presence or absence of a magnetic field from the energized magnet;
  d. a permanent magnet for urging the armature in a direction opposite to the direction in which the armature is responsive to the energized magnet;
  e. a valve seat disposed between said armature and said fluid entrance or said fluid exit effective to seal such fluid entrance or the fluid exit when the armature is displaced into fluid sealing abutting relationship with the entrance or the exit; and
  f. means for guiding said armature between said fluid entrance and said fluid exit, wherein the guide means comprises a leaf spring.

24. A micromachined microvalve, comprising:
  a. a valve housing defining an interior space, a fluid entrance, and a fluid exit;
  b. a selectively energizable magnet;
  c. an armature comprising a ferromagnetic material, the armature disposed within the interior space and displaceable therein between the fluid entrance and the fluid exit in response to the presence or absence of a magnetic field from the energized magnet;
  d. a permanent magnet for urging the armature in a direction opposite to the direction in which the armature is responsive to the energized magnet;
  e. a valve seat disposed between said armature and said fluid entrance or said fluid exit effective to seal such fluid entrance or the fluid exit when the armature is displaced into fluid sealing abutting relationship with the entrance or the exit; and
  f. means for guiding said armature between said fluid entrance and said fluid exit, wherein the means for guiding the armature is a non-magnetic material.

25. A method for the fabrication of the microvalve of claim 1, wherein said microvalve further comprises a nozzle into which said fluid exit opens, said microvalve further comprising a selectively magnetizable nozzle extension, said method comprising: (a) assembling as separate components, said valve housing, said armature, said permanent magnet, said valve seat, and said selectively magnetizable nozzle extension; and (b) assembling the separate components in operable fashion.

26. The method defined by claim 25, wherein said valve housing comprises upper and lower housing portions, said step of assembling said valve housing further comprising joining said portions by laser welding.

27. The method defined by claim 25, wherein said permanent magnet is susceptible of having its own degree of magnetization changed in a defined manner, said method further comprising (c) adjusting the magnetization of said permanent magnet effective to maintain said armature at a desired location within the interior space of the valve housing.

28. A valve comprising:
a valve housing defining a fluid entrance, a fluid exit, and an interior; a freely-retained ferromagnetic valve body disposed in the interior and moveable therein; a unitary valve seat comprising a micromachined single crystal material; said valve body and valve seat adapted to engage in sealing and opening relationship.

29. The valve defined by claim 28, wherein said fluid exit comprises a nozzle.

30. The valve defined by claim 28, further comprising a selectively energizable electromagnet effective to move said valve body as an armature.

31. A valve comprising:
a valve housing defining a fluid entrance, a fluid exit, and an interior; a freely-retained ferromagnetic valve body disposed in the interior and movable therein; a unitary valve seat comprising a micromachined single crystal material; said valve body and valve seat adapted to engage in sealing and opening relationship; and an internal filter disposed between the valve seat and the fluid exit.

32. The valve defined by claim 31, wherein said internal filter is a solid state, micromachined device.

33. A method for controlling the flow of a gas, comprising:
(a) providing a housing in fluid flow stream, said housing comprising a fluid flow path through a fluid entrance, an internal space, and a fluid exit;
(b) providing in said flow path adjacent said internal space a valve seat;
(c) providing in said internal space a magnetically susceptible armature, the armature comprising means for sealing said valve seat when in abutting relation therewith;
(d) supplying pressurized gas in fluid communication with said fluid entrance; and
(e) subjecting said armature selectively to a magnetic force effective to abut said armature with said valve seat and prevent flow, or changing the application of said selectively applied magnetic force effect to cause said armature and said valve seat to move apart and thereby allow flow, the armature being sized relative to the internal space such that, during a portion of said moving apart of said armature and valve seat, a clearance is established between the entire outer surface of said armature and the inner surface of the housing.

34. A microvalve, comprising:
a. a valve housing defining an interior space, a fluid entrance, and a fluid exit;
b. a selectively energizable electromagnet;
c. an armature comprising a ferromagnetic material, the armature being disposed within the interior space and displaceable therein between the fluid entrance and the fluid exit in response to the presence or absence of a magnetic field from the energized electromagnet;
d. a permanent magnet for urging the armature in a direction opposite to the direction in which the armature is responsive to the energized electromagnet;
e. a valve seat disposed between said armature and said fluid entrance or said fluid exit effective to seal such fluid entrance or the fluid exit when the armature is displaced into fluid-sealing abutting relationship with the entrance or the exit; and
f. a solid-state body disposed in the interior space, said body comprising two silicon layers in bonded adjacency wherein one of the layers has a groove formation selected from the group consisting of micromachined and microetched groove formations, said groove formation being closed by the bonded adjacency of the other layer and which thereby defines a fluid-flow path within said body, said body being disposed between said armature and said entrance or exit and including said valve seat.

35. The microvalve of claim 34, wherein said groove formation includes a comb-filter portion between inlet and outlet portions of said flow path.

36. A microthruster, comprising an electrically operable microvalve having an inlet and an outlet, a source of pressurized gas in fluid communication with said inlet, and an electrical supply connected for operation of said microvalve, said microvalve comprising:
a. a valve housing defining an interior space, a fluid entrance, and a fluid exit;
b. a selectively energizable electromagnet connected for operational use of said electrical supply;
c. an armature comprising a ferromagnetic material, the armature disposed within the interior space and displaceable therein between the fluid entrance and the fluid exit in response to the presence or absence of a magnetic field from the energized electromagnet;
d. a permanent magnet for urging the armature in a direction opposite to the direction in which the armature is responsive to the energized electromagnet;
e. a valve seat of photoetched single-crystal material disposed between said armature and said fluid entrance or said fluid exit effective to seal such fluid entrance or the fluid exit when the armature is displaced into fluid-sealing abutting relationship with such entrance or such exit;
f. a micromachined body disposed in the interior space, said body having a fluid-flow path providing a filter in said path and disposed between said armature and said entrance or exit and including said valve seat; and
g. a discharge nozzle formation constituting an integral part of said body.

37. The microthruster of claim 36, in which said body comprises two silicon layers in bonded adjacency wherein one of said layers has a groove formation which is closed by the bonded adjacency of the other layer and which thereby defines (a) the fluid path and (b) a filter formation as a part of said fluid path.

38. The microthruster of claim 37, wherein the filter formation is a comb filter.

* * * * *